US008499002B2

(12) United States Patent
Miyamoto et al.

(10) Patent No.: US 8,499,002 B2
(45) Date of Patent: Jul. 30, 2013

(54) APPARATUS AND METHOD FOR CONTROLLING DEVICES IN REQUESTED RESOURCE VIA NETWORK

(75) Inventors: Takahiro Miyamoto, Saitama (JP); Michiaki Hayashi, Saitama (JP)

(73) Assignee: KDDI Corporation, Tokyo (JP)

( * ) Notice: Subject to any disclaimer, the term of this patent is extended or adjusted under 35 U.S.C. 154(b) by 44 days.

(21) Appl. No.: 13/039,827

(22) Filed: Mar. 3, 2011

(65) Prior Publication Data

US 2011/0238692 A1   Sep. 29, 2011

(30) Foreign Application Priority Data

Mar. 24, 2010 (JP) ................................. 2010-068493

(51) Int. Cl.
*G06F 17/30* (2006.01)
(52) U.S. Cl.
CPC .............................. *G06F 17/30017* (2013.01)
USPC ...................................................... 707/769
(58) Field of Classification Search
USPC ................ 707/759, 969, 770, 769, 794, 796, 707/827; 711/4, 111, 112, 156
See application file for complete search history.

(56) References Cited

U.S. PATENT DOCUMENTS

| 7,647,461 B2 * | 1/2010 | Muhlestein et al. | 711/162 |
| 2008/0013510 A1 * | 1/2008 | Salokannel et al. | 370/338 |
| 2009/0171474 A1 * | 7/2009 | Birze et al. | 700/3 |

FOREIGN PATENT DOCUMENTS

| JP | A-2002-051386 | 2/2002 |
| JP | A-2003-052092 | 2/2003 |

OTHER PUBLICATIONS

P. Sarkar et al., Internet Protocol storage area networks, 2003, IEEE, vol. 42, 218-231.*

* cited by examiner

*Primary Examiner* — Jean B Fleurantin
(74) *Attorney, Agent, or Firm* — Oliff & Berridge, PLC

(57) ABSTRACT

A registry storage stores information of device configurations and device identifiers, on a per-device basis. A repository storage stores a correspondence between the device identifiers and device controllers which match the respective devices. A sub-plurality of the plurality of device controllers provide the same function, and are executed in the respective devices, by calling a common interface which is shared between the device controllers. At least one of the device identifiers which corresponds to one associated device is retrieved from the registry storage, a device controller which corresponds to the retrieved device-identifier is retrieved, the retrieved device controller is installed into a library and executed, and the executed device controller is uninstalled from the library.

8 Claims, 7 Drawing Sheets

APPARATUS AND METHOD FOR CONTROLLING DEVICES IN REQUESTED RESOURCE VIA NETWORK

CROSS-REFERENCE TO RELATED APPLICATIONS

This application claims the priority benefit of Japanese Patent Application No. 2010-068493, filed Mar. 24, 2010, the content of which application is incorporated herein by reference in its entirety.

BACKGROUND OF THE INVENTION

1. Field of the Invention

The invention relates generally to techniques of controlling physical devices in a resource via network, such as a network resource, a computational resource and/or a storage resource.

2. Description of the Related Art

In recent years, a large-scale high-performance computational system can be built by interconnecting geographically dispersed computational resources and storage resources via high-speed network resources. Virtualization technologies abstract resources from physical devices so as to reflect differences between the physical devices. This allows physical properties of each physical device within a requested one of computational resources, storage resources and network resources (e.g., a CPU utilization, a memory size, a disc storage capacity, a communication bandwidth, etc.) to be assigned to different users.

FIG. 1 illustrates a computer grid system 110 architected by interconnecting geographically dispersed computational resources 100 and storage resources 102 via network resources 104. At each site, some of the computational resources 100 and some of the storage resources 102 together constitute a computer cluster or computer clusters 120. The network resources 104 help a network 200 to work.

In an example illustrated in FIG. 1, one of the network resources 104 is selected as an exemplary requested resource, and includes a plurality of controllable devices 5. A group of these devices 5 is enumerated as a group of an edge switch A 5a, a core switch A 5b, a router 5c, an edge switch B 5d, an edge switch 5f, and an edge switch 5g. These devices 5 are connected with a device-control unit 1.

The device-control unit 1 is configured to remotely control each device 5 to control requested resources. It is required for the requested resource to be reserved so as to prevent or eliminate undesirable delay, instability of bandwidth, and/or computational overburden during a communication session.

In an exemplary implementation, the device-control unit 1 controls each device 5, in response to a request issued from an operation client device 2 (e.g., a personal computer) which is manipulated by an operator for management. It is of course that the device-control unit 1 may alternatively control in response to a request issued from an SIP (Session Initiation Protocol) server.

This allows stabilized QoS (Quality of Service) control to be performed so as to guarantee an end-to-end communication quality, while a session has been established.

A relevant technique is disclosed in, for example, Japanese Patent Application Publication No. 2002-051386, which is for controlling a plurality of controllable devices, by selecting a corresponding one of a plurality of device controller embedded within a device-control unit.

This technique allows control devices without updating internal programs for each device.

Another relevant technique is disclosed in, for example, Japanese Patent Application Publication No. 2003-052092, which is for selecting one of a plurality of stored program components to control a device, according to a user request.

BRIEF SUMMARY OF THE INVENTION

As described above, the device-control unit, which is for use in controlling a plurality of requested resources, is required to select devices, which match the resource request, and to control devices.

A traditional version of a device-control unit had to control each device by using a corresponding device controller, which vary between these devices. The reason is that the devices are controlled by executing source codes varying in content between the different devices (i.e., different manufacturers of these devices), even though these source codes share the same function to be provided.

This unavoidably causes a situation in which, as the number and the scale of resources that have to be managed by the device-control unit increase, the number and the amount of source codes for control which vary between the devices become huge. In addition, each that a new device is added to a resource, the device-control unit had to have an additional source code for control for the newly-added new device.

It is added that the aforementioned Japanese Patent Application Publications No. 2002-051386 and No. 2003-052092 assume that unique program components for individual devices have been previously prepared on a device-by-device basis.

In view of the foregoing, it would be desirable to allow a device-control unit to control devices according to a resource request, without requiring execution of control in different manners, which results in a reduction in the computational burden on the device-control unit for controlling the devices.

According to a first aspect of the invention, there is provided an apparatus connected via a communication network, with a plurality of controllable devices which are associated with a resource, the apparatus operating for controlling the devices, in combination with:

a registry storage for storing information of device configurations and device identifiers for identifying the respective devices; and a repository storage for storing a correspondence between the device identifiers and device controllers which match the respective devices, and which are executed to control the respective devices, by calling a common interface which is shared between the device controllers, the apparatus comprising:

a resource-request receiver configured to receive a resource request including information for identifying a requested resource which is requested to be controlled, and information for identifying a requested size of the requested resource which is requested to be reached;

a service manager configured to retrieve from the registry storage, at least one of the device identifiers which corresponds to at least one designated device, as at least one designated device-identifier, wherein the at least one designated device is at least one of the plurality of devices which is associated with the requested resource of the received resource-request;

a repository retriever configured to retrieve from the repository storage, one of the device controllers which corresponds to the retrieved designated device-identifier, and to install the retrieved device controller into a library; and a control manager configured to call the common interface of the designated device controller installed in the library, to thereby execute the designated device controller in order to control the requested resource on the designated device to reach the requested size, and, after completion of the control of the designated device, to uninstall the called device controller from the library.

According to a second aspect of the invention, there is provided a method implemented in an apparatus connected via a communication network, with a plurality of controllable devices which are associated with a resource, the method implemented for controlling the devices, using:

a registry storage for storing information of device configurations and device identifiers for identifying the respective devices; and a repository storage for storing a correspondence between the device identifiers and device controllers which match the respective devices, and which are executed to control the respective devices, by calling a common interface which is shared between the device controllers, the method comprising:

receiving a resource request including information for identifying a requested resource which is requested to be controlled, and information for identifying a requested size of the requested resource which is requested to be reached;

retrieving from the registry storage, at least one of the device identifiers which corresponds to at least one designated device, as at least one designated device-identifier, wherein the at least one designated device is at least one of the plurality of devices which is associated with the requested resource of the received resource-request;

retrieving from the repository storage, one of the device controllers which corresponds to the retrieved designated device-identifier;

installing the retrieved device controller into a library;

calling the common interface of the designated device controller installed in the library, to thereby execute the designated device controller, in order to control the requested resource on the designated device to reach the requested size; and after completion of the control of the designated device, uninstalling the called device controller from the library.

It is noted here that, as used in this specification, the singular form "a," "an," and "the" include plural reference unless the context clearly dictates otherwise. It is also noted that the terms "comprising," "including," and "having" can be used interchangeably.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
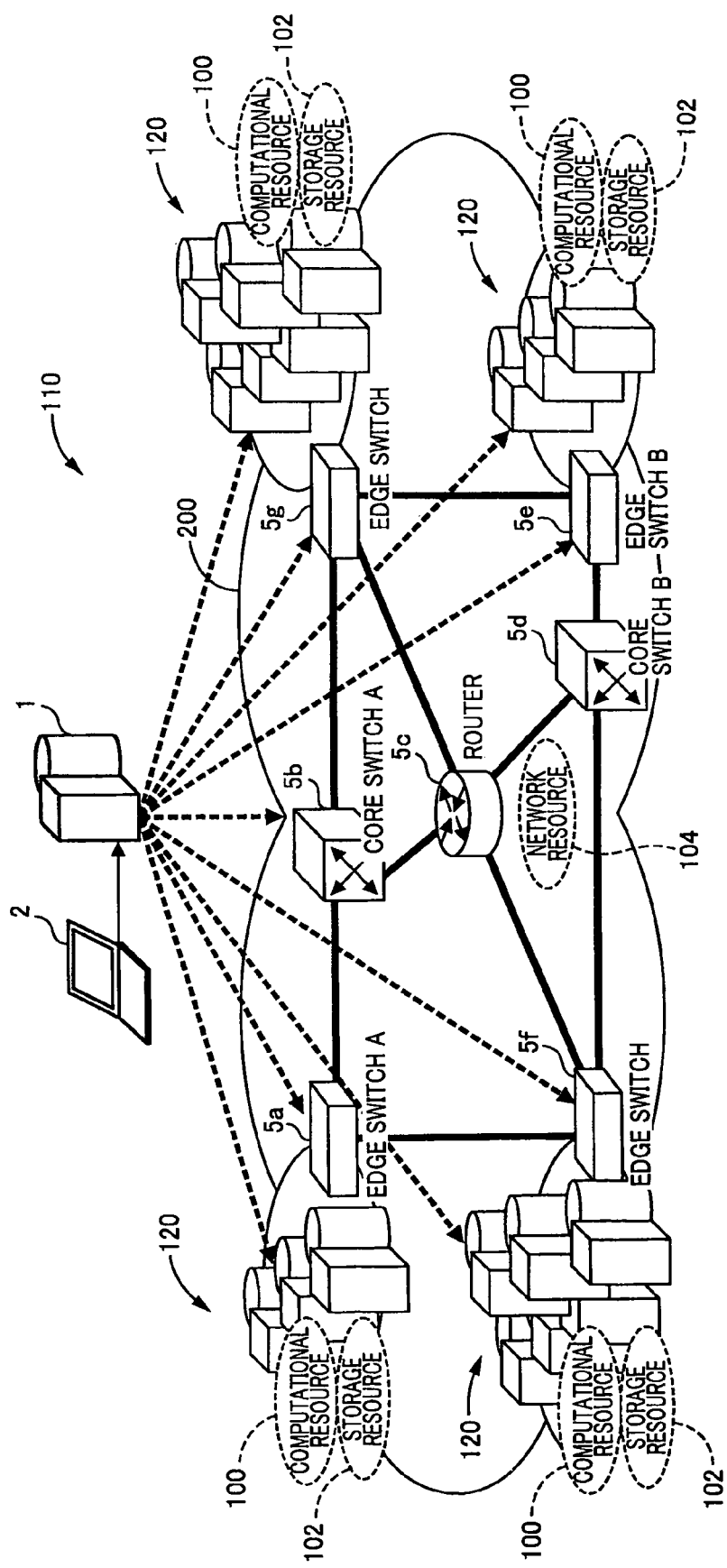
FIG. 1 is a schematic view illustrating a typical grid system with which a device-control unit constructed according to a first illustrative embodiment of the present invention is used.

According to the invention, the following modes are provided as illustrative embodiments of the invention.

According to a first mode of the invention, there is provided the apparatus according to the first aspect, wherein the registry storage includes a registry storage server located outside of the apparatus, the repository storage includes a repository storage server located outside of the apparatus, the apparatus is connected with the registry storage server and the repository storage server, via the network, the service manager is configured to retrieve the at least one designated device-identifier from the registry storage server, for the requested resource, and the repository retriever is configured to retrieve the designated device controller from the repository storage server, for each device-identifier.

According to a second mode of the invention, there is provided the apparatus according to the first aspect or the first mode, wherein the library is an OSGi (Open Services Gateway initiative) framework, and each of the device controllers is a bundle of Java modules.

According to a third mode of the invention, there is provided the apparatus according to the first aspect, the first or second mode, wherein the resource request includes, in addition to information for the requested resource and the requested size, a projected instant-time, the apparatus further comprising a schedule manager configured to hold the resource request, determine, using a timer, whether the projected instant-time has been reached, and, if so, deliver the resource request to the resource-request receiver.

According to a fourth mode of the invention, there is provided the apparatus according to the first aspect or any one of the first through third modes, wherein the control manager is further configured to uninstall the designated device controller from the library, if a predetermined length of time has elapsed since completion of control of the designated device controller by the control manager.

According to a fifth mode of the invention, there is provided the apparatus according to the first aspect or any one of the first through fourth modes, wherein the resource includes at least one of a network resource, a computational resource, and a storage resource, the apparatus controls the network resource when selected as the requested resource, such that at least one of a communication bandwidth and forwarding priority is controlled, controls the computational resource when selected as the requested resource, such that at least one of a CPU clock frequency, a CPU core number, a memory size, a disc storage capacity and a communication bandwidth is controlled, and controls the storage resource when selected as the requested resource, such that at least one of a disc storage capacity, a storage redundancy level and a communication bandwidth is controlled.

According to a sixth mode of the invention, there is provided a computer-readable non-transitory storage medium having stored therein a program, when executed by a computer, to implement the method according to the second aspect.

The term "program" may be interpreted as, for example, a combination of a set of instructions implemented by a computer to perform the function(s) of the program, and associated files, data or the like to be processed according to the instructions.

In addition, the term "program" may be interpreted as, for example, a structure which achieves the intended purpose(s) by being solely executed by a computer, or a structure which achieves the intended purpose(s) by being executed by a computer together with another program or other programs. In the latter case, the term "program" may be constructed mainly as a data structure, for example.

Several presently preferred embodiments of the invention will be described in more detail by reference to the drawings in which like numerals are used to indicate like elements throughout.

[First Illustrative Embodiment]

Referring now to FIG. 1, the configuration of a device-control unit 1 according to a first illustrative embodiment of the present invention is conceptually illustrated, together with a grid system in which the device-control unit 1 participates.

Roughly described, a resource that can be controlled by the device-control unit 1 is at least one of a computational resource 100, a storage resource 102, and a network resource 104. The device-control unit 1 is connected via a network 200, with a plurality of controllable devices 5 located within the resources 100, 102 and 104, and controls the resources 100, 102 and 104 according to a resource request.

The device-control unit 1 controls the network resource 104 when selected as the requested resource, such that at least one of a communication bandwidth and forwarding priority is controlled, controls the computational resource 100 when selected as the requested resource, such that at least one of a CPU clock frequency, a CPU core number, a memory size, a disc storage capacity and a communication bandwidth is controlled, and controls the storage resource 102 when selected as the requested resource, such that at least one of a disc storage capacity, a storage redundancy level and a communication bandwidth is controlled. For the sake of the ease of description, only how to control physical parameters of the hardware resource 14 will be elaborated below.

Figure 2:
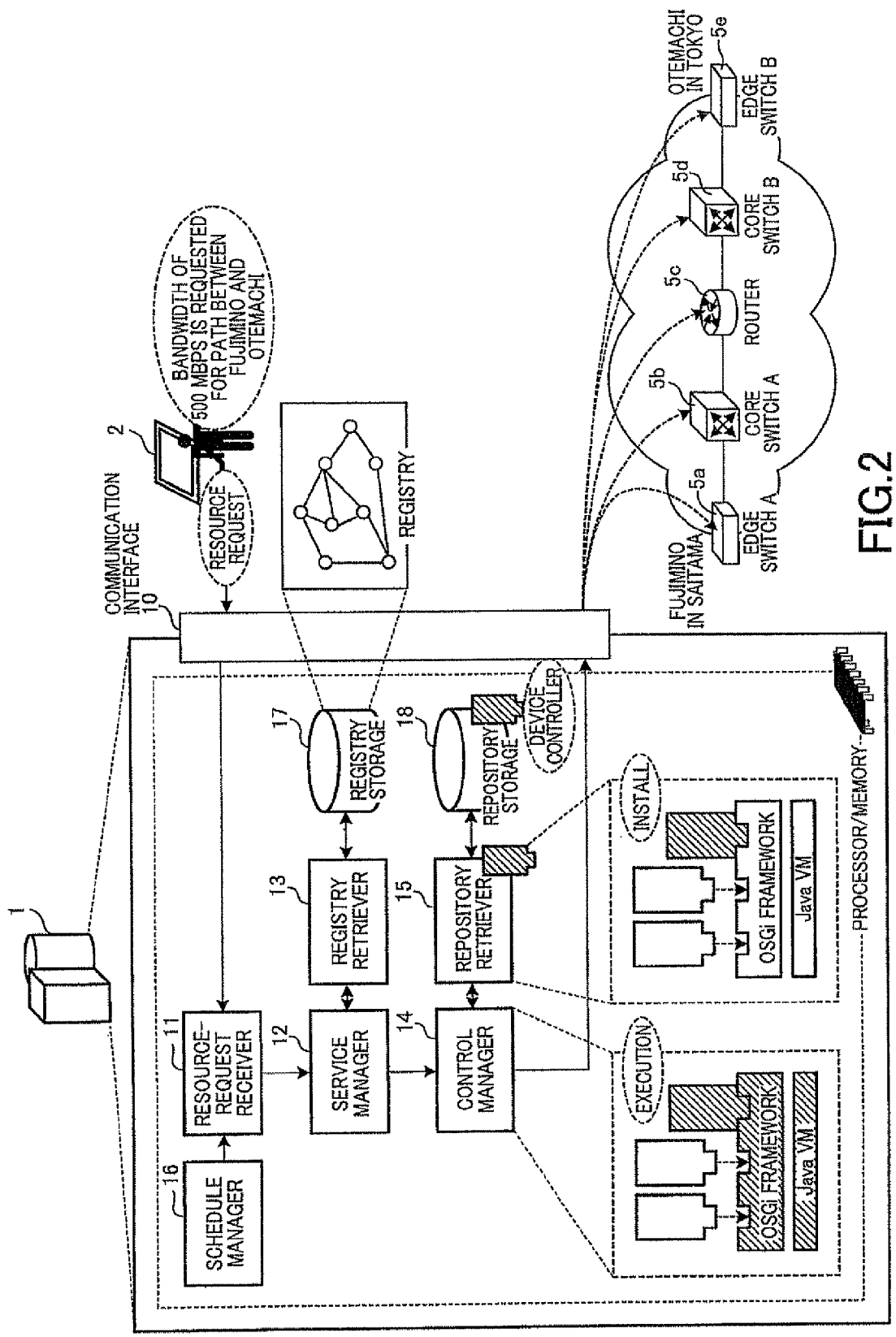
FIG. 2 is a schematic block diagram illustrating the device-control unit depicted in FIG. 1.

Referring next to FIG. 2, the device-control unit 1 is illustrated in functional block diagram.

The device-control unit 1 is connected via the network 200, with the devices 5 located within the network resource 104 (which are enumerated as an edge switch A 5a, a core switch A 5b, a router 5c, a core switch B 5d, an edge switch B 5e, an edge switch 5f, and an edge switch 5g, which are serially interconnected in the description order, in an example illustrated in FIG. 2. The device-control unit 1 is configured to control the devices 5, according to a resource request issued from an operation client device (e.g., a personal computer) 2 manipulated by an operator for management.

The resource request is defined to include information for identifying a requested resource which is requested to be controlled, and information for identifying a requested size of the requested resource which is requested to be reached. The requested resource indicates a requested one of a plurality of computational resources (including the computational resource 100), a plurality of storage resources (including the storage resource 102), and a plurality of network resources (including the network resource 104). The requested size indicates a requested or desired value or amount of each physical parameter of the requested resource. The requested resource, in the present embodiment, is the network resource 104, for example.

The device-control unit 1 is configured to include: a communication interface 10; a resource-request receiver 11; a service manager 12; a registry retriever 13; a control manager 14; a repository retriever 15; a schedule manager 16; a registry storage 17; and a repository storage 18. The device-control unit 1 is connected, at the communication interface 10, via the network 200, with the devices 5 within a resource. These constituents of the device-control unit 1, excepting the communication network 10, are implemented by causing a processor to execute a predetermined program which has been stored in a memory.

Firstly, a storage function of the device-control unit 1 will be described.

The registry storage 17 has stored therein information of device configurations including the way how associated ones of the devices 5 within each resource are interconnected (e.g., information on the sequence in which these associated devices 5 are interconnected physically or logically). The registry storage 17 has further stored therein at least one device identifier of at least associated one of the devices 5, in association with each resource. More specifically, the registry storage 17 has stored therein information about the topology of the associated devices 5 (i.e., a physical or logic sequence in which the associated devices 5 are interconnected) within each resource, and a correspondence between the associated devices 5 and the device identifiers, per each resource.

In an example, the registry storage 17 has stored therein the following correspondence:

Resource: network resource located between the city of Fujimino and the city of Otemachi, and Device identifiers: device identifiers for edge switch A, core switch A, router, core switch B, and edge switch B.

The repository storage 18 has stored therein a repository referring to associated device controllers (i.e., Java modules), per each device 5. In the present embodiment, the whole set of device controllers are classified by a function to be provided by each device controller, and by ones of the devices 5 in which each device controller can be activated. More specifically, the repository storage 18 has stored therein a correspondence between the device identifiers and associated at least one of the device controllers, which can be activated in each device 5 identified by each device identifier.

In an example, the repository storage 18 has stored therein the following correspondence:

Device identifier ID1 --> Device Controller X1.

It is added that, typically, one resource has one or more devices, one device corresponds to one device identifier, and one device controller corresponds to one or more devices or device identifiers. That is, the correspondence between the device identifiers and the device controllers can be a many-on-one correspondence.

Then, how a framework and device controllers are related to each other will be described.

The device-control unit 1 functions according to the OSGi (Open Services Gateway initiative) specification. The OSGi Alliance refers to a standards organization that standardized the Java-based service platform for remote control. This organization principally standardized a "framework" and "bundles" for an application library, to thereby specify many OSGi services. The OSGi framework is preferable in controlling associated ones of the devices 5 within the network resource 104.

The OSGi framework implements a complete and dynamic component model that does not exist in standalone Java/VM (Virtual Machine) environments. Associated components are Java modules (control modules), referred to as "bundle." A platform that implements this bundle is referred to as "OSGi framework." This bundle is a JAR (Java Archive) file, which is a group of class files and resource files, forming into an archive, equipped with a manifest file containing attributes unique to the OSGi specification. The OSGi framework enables the bundles to be installed and run. As illustrated in FIG. 2, a Java VM (Virtual Machine) built in the device-control unit 1 executes a designated control module, to thereby perform desired processing.

Figure 3:
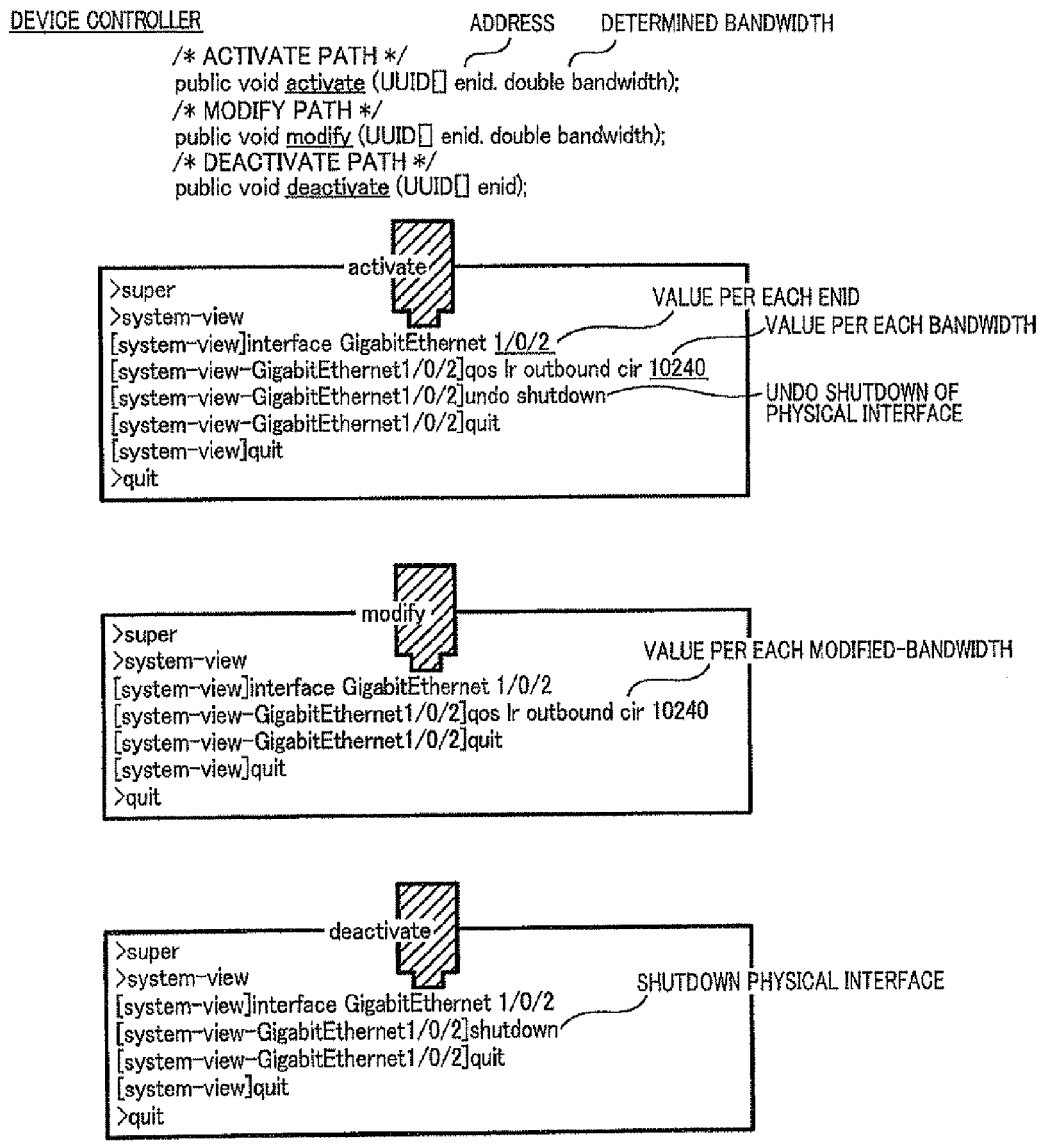
FIG. 3 is a view illustrating examples of device controllers executed by the device-control unit depicted in FIG. 1, wherein each device controller has a common interface to other device controllers, and a unique command code.

FIG. 3 illustrates exemplary device controllers, each of which includes a common interface and a command code.

As illustrated in FIG. 3, three control functions (i.e., operation) of a device controller are exemplified, and these are, as shown below, a control function for activating a path, a control function for modifying a path, and a control function for deactivating a path. For device controllers for providing the same control function (i.e., operation), these device controllers have program parts (e.g., source codes) which vary in content between different kinds of devices 5 (e.g., manufacturers and/or firmware versions of the devices 5) where these device controllers can be activated. In the present embodiment, however, these device controllers, which share the same control function (i.e., operation) but are executed indifferent devices 5, have assigned a common interface, which refers to a control function (i.e., expression) to be referenced for calling or invoking a particular one of the device controllers:

activate( ) with common interface for activating a path;
modify( ) with common interface for modifying a path; and
deactivate( ) with common interface for deactivating a path.

In addition, each device controller contains the following command codes. At the upper portion of FIG. 3, three control functions (i.e., expressions) are illustrated which correspond to the three control functions described above, each control function (i.e., expression) is assigned variables, and each variable refers to a command code which acts as a parameter for defining control to be performed:

[enid]: address of device (network link); and
[double bandwidth]: assigned bandwidth.

Even though selected ones of the device controllers are ones that match different ones of the devices 5 (i.e., one device controller can be executed in only one of the devices 5, and cannot be executed in other devices 5, which shows incompatibility), if these selected device controllers share the same control function (i.e., operation) to be provided, these selected device controllers can be called using the same interface. Once a particular one of the device controllers is called, you can login, using telnet, to the address of a designated one of the devices 5, which is identified by the value of "[enid]", and the command codes illustrated in FIG. 3 are executed.

In the present embodiment, device controllers which share the same control function share the common interface, while having unique source codes.

Referring back to FIG. 2, how the device-control unit 1 is configured, and how the device-control unit 1 operates, upon reception of a resource request from the operation client device 2, will be described.

The resource-request receiver 11 is configured to receive from the operation client device 2, via the network 200, a resource request containing information on a requested resource (i.e., a designated one of computational, storage or network resources 100, 102 or 104) and a requested size of the requested resource (i.e., a target physical value of the requested resource). In an example, the requested resource and the requested size are defined as follows:

Requested Resource: network resource between the city of Fujimino and the city of Otemachi, and
Requested Size: communication bandwidth of 500 Mbps.

The resource-request receiver 10 is further configured to send the received requested-resource and requested-size to the service manager 12.

The service manager 12 is configured to send, in response to reception of the resource request from the resource-request receiver 10, a retrieval request to the registry retriever 13, is further configured to receive from the registry retriever 13, as a registry, at least one device identifier which identifies at least one of the devices 5 which is associated with the requested resource, and is still further configured to send to the device controller 14, the received at least one device-identifier, along with the requested size.

The registry retriever 13 is configured to retrieve from the registry storage 17, at least one device identifier which identifies at least one of the devices 5 which is associated with the requested resource received from the service manager 12, and is further configured to send to the service manager 12, the retrieved at least one device-identifier.

The repository retriever 15 is configured to retrieve from the repository storage 18, in response to reception of a retrieval request from the control manager 14, one device controller which corresponds to the retrieved at least one device-identifier, and is further configured to then install the retrieved device controller into a library which is the OSGi framework.

The control manager 14 is configured to send a retrieval request to the repository retriever 15 for retrieving and then installing into the library, one device controller corresponding to the retrieved at least one device identifier, on a per-device-identifier basis, and is further configured to then call the common interface of the installed one device controller for execution thereof, to thereby control the associated device 5 to satisfy the requested size.

More specifically, the control manager 14, in operation, initially determines whether or not the same device controller as a currently-selected one of the retrieved at least one device controller, has been already activated. Unless so, the control manager 14 then requests the repository retriever 15 to download the currently-selected device controller from the repository storage 17.

The repository retriever 15 is configured to request, in response to reception of the retrieval request from the control manager 14, the repository storage 18 to retrieve therefrom at least one device controller corresponding to a current one of the retrieved device-identifiers. The repository retriever 15, upon retrieval of the associated device controller from the repository storage 18, installs the retrieved device controller into the library.

Then, the control manager 14 calls the common interface of the installed current device controller, to thereby execute the current device controller.

For each device controller, which has the common interface and a program part, the common interface has been published, while the program part (i.e., an internal implementation) has not been published. When one requested resource is associated with a plurality of controllable devices 5, the repository retriever 15 installs into the library, a plurality of device controllers varying between the associated devices 5.

These device controllers, however, if share the same control function to be provided, can be called by the common interface, which is shared between the devices 5, to thereby provide the same control function.

After the execution of one device controller has been completed, the control manager 14 uninstalls the executed device controller from the library. The uninstallation of an executed device controller makes it unnecessary for the device-control unit 1 itself to continue management of the device controller, resulting in a reduction in the computational burden.

In the present embodiment, if the resource request includes, in addition to information about the requested resource and the requested size, a projected instant-time, the schedule manager 16 operates to hold the resource request, determine, using a timer (although not shown, built in the processor in an ordinary manner), whether the projected instant-time has been reached, and, if so, deliver the resource request to the resource-request receiver 11.

Figure 4:
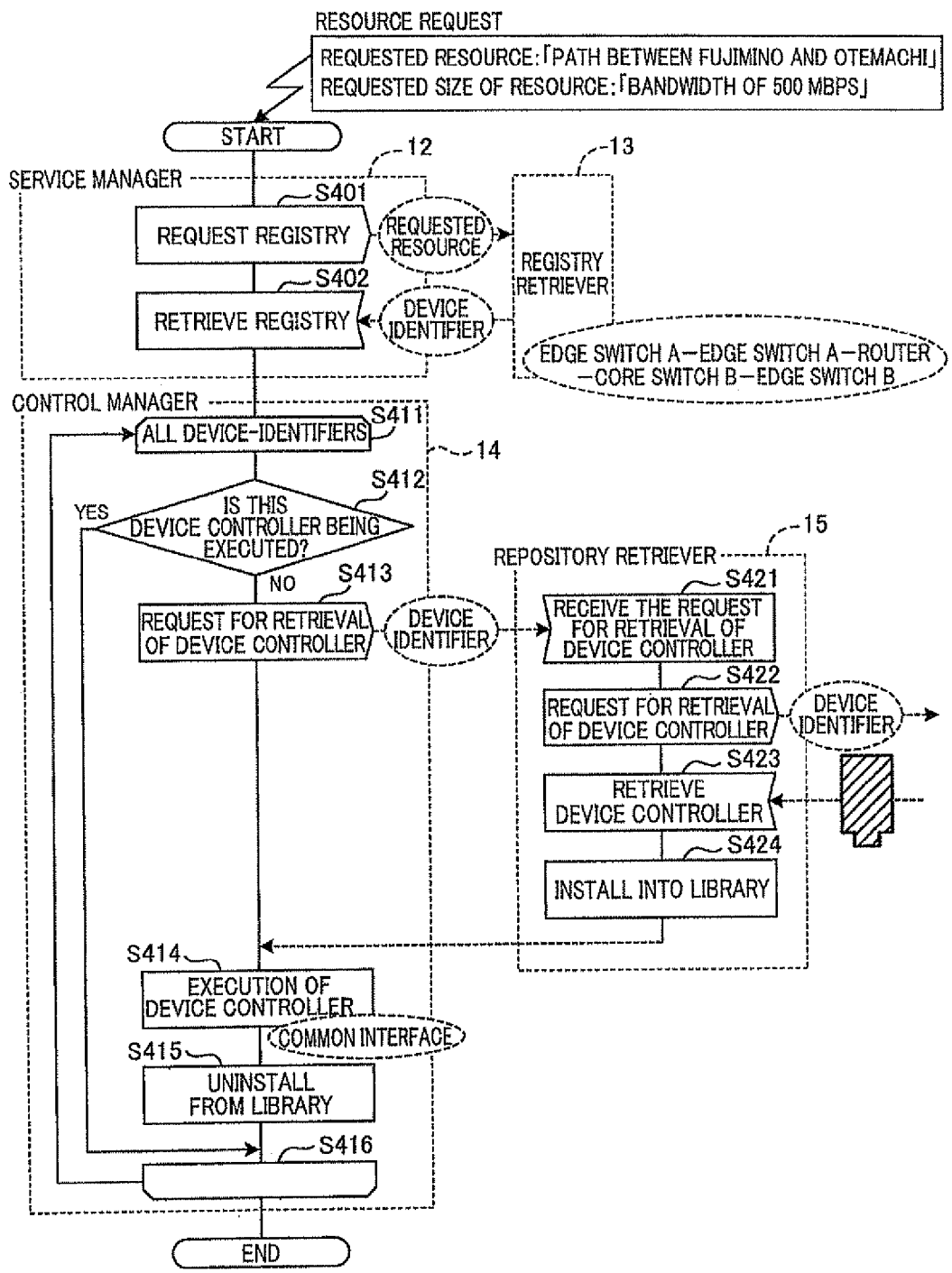
FIG. 4 is a flowchart conceptually illustrating a device-control method implemented by the device-control unit depicted in FIG. 1.
Figure 5:
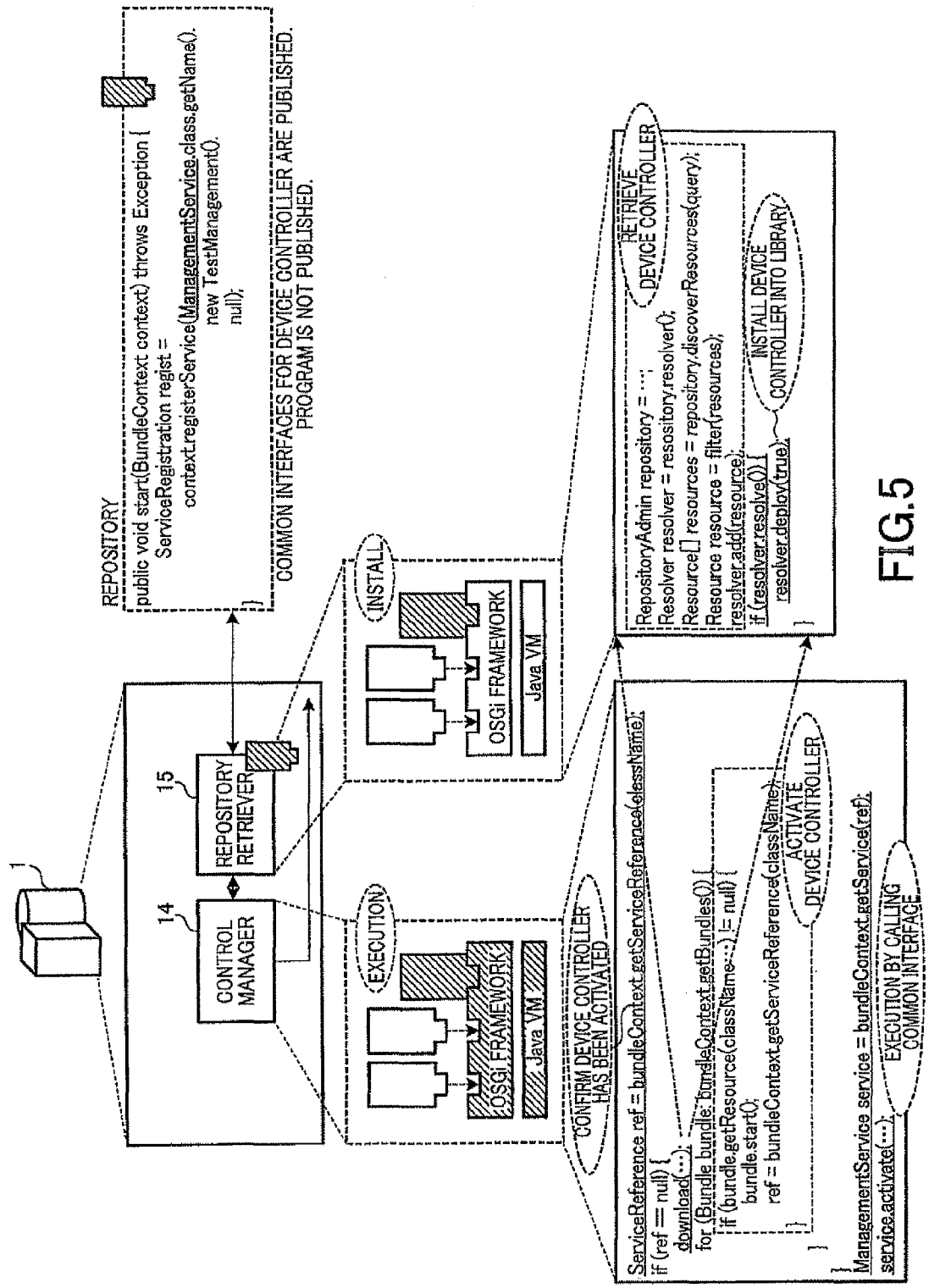
FIG. 5 is a view illustrating source codes executed by a control manager and a repository retriever depicted in FIG. 4.

Referring next to FIG. 4, a device-control method according to the first embodiment of the invention is conceptually illustrated in flowchart, which also represents a program to be executed by the processor for implementing this device-control method. It is added that FIG. 5 illustrates source codes to be executed by the processor for implementing the control manager 14 and the repository retriever 15.

This device-control method begins with step S401 in which the service manager 12 sends, in response to reception of the resource request from the resource-request receiver 10, a retrieval request to the registry retriever 13.

Step S402 follows in which the service manager 12 receives from the registry retriever 13, at least one device identifier which identifies at least one of the devices 5 which is associated with the requested resource, and sends to the control manager 14, the received at least one device-identifier, along with the requested size.

A loop from step S411 to S416 repeats in which the control manager 14 sends a retrieval request to the repository retriever 15 for retrieving and then installing into the library, one device controller corresponding to the retrieved at least one device identifier, on a per-device-identifier basis, and then calls the common interface of the installed at least one device controller for execution thereof, to thereby control the associated device 5 to satisfy the requested size.

More specifically, step S412 is implemented in which the control manager 14 determines whether or not the same device controller as a currently-selected one of the retrieved at least one device controller, has been already activated. Unless so, step S413 is implemented in which the control manager 14 requests the repository retriever 15 to download the currently-selected device controller from the repository storage 17.

Step S421 is implemented in which the repository retriever 15 receives the retrieval request from the control manager 14, and step S422 is then implemented in which the repository retriever 15 requests the repository storage 18 to retrieve therefrom one device controller corresponding to a current one of the retrieved device-identifiers.

Step S423 follows in which the repository retriever 15 retrieves the associated device controller from the repository storage 18, and step S424 follows in which the repository retriever 15 installs the retrieved device controller into the library.

Then, step S414 is implemented in which the control manager 14 calls the common interface of the installed current device controller, to thereby execute the current device controller. Step S415 follows in which, after the execution of one device controller has been completed, the control manager 14 uninstalls the executed device controller from the library.

[Second Illustrative Embodiment]

Next, a second illustrative embodiment of the invention will be described. However, because the present embodiment is common to the first embodiment with respect to many elements, only different elements from those of the first embodiment will be described and illustrated, while common elements to those of the first embodiment will be referenced the same reference numerals or names as those of the first embodiment, without redundant description or illustration.

Figure 6:
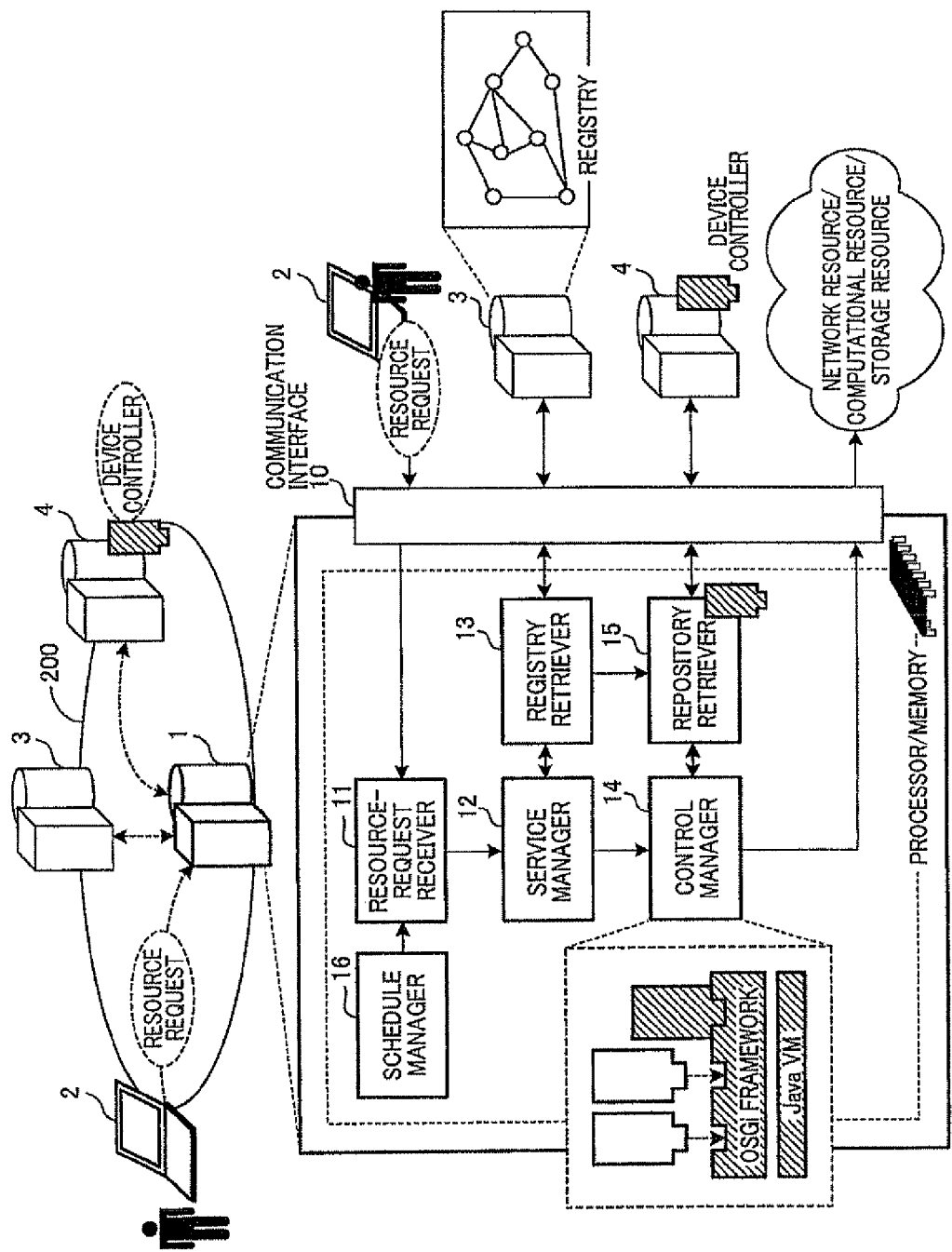
FIG. 6 is a schematic block diagram illustrating a device-control unit constructed according to a second illustrative embodiment of the present invention.

Referring next to FIG. 6, a device-control unit 1 according to the second embodiment is illustrated, which is common to the device-control unit 5 depicted in FIG. 2, except for the registry storage 17 and the repository storage 18.

In the present embodiment, the registry storage 17 and the repository storage 18 have been replaced with a registry storage server 3 and a repository storage server 4, both of which are physically separate from the device-control unit 1. The device-control unit 1 is connected via the network 200 with the registry storage server 3 and the repository storage server 4.

Like the registry storage 17 in the first embodiment, the registry storage server 3 is configured to store the registry, which is accessed by the registry retriever 13 for retrieval of the registry. In addition, like the repository storage 18 in the first embodiment, the repository storage server 4 is configured to store the repository, which is accessed by the repository retriever 15 for retrieval of the repository.

[Third Illustrative Embodiment]

Next, a third illustrative embodiment of the invention will be described. However, because the present embodiment is common to the first embodiment with respect to many elements, only different elements from those of the first embodiment will be described and illustrated, while common elements to those of the first embodiment will be referenced the same reference numerals or names as those of the first embodiment, without redundant description or illustration.

Figure 7:
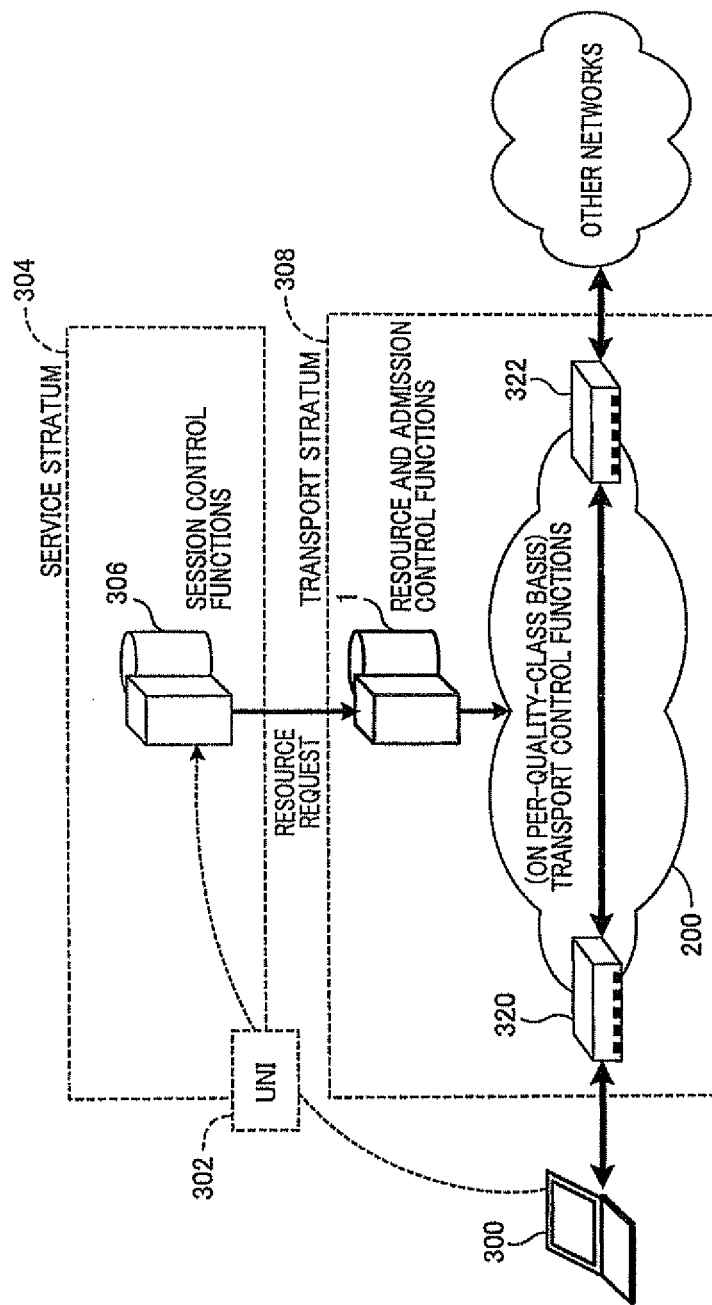
FIG. 7 is a schematic view illustrating a device-control unit constructed according to a third illustrative embodiment of the present invention, which is used with a next generation network.

Referring next to FIG. 7, a next generation network (NGN) system using a device-control unit 1 according to the present embodiment is schematically illustrated.

As illustrated in FIG. 7, in the present embodiment, the device-control unit 1 is configured to have resource and admission control functions (RACF) in the NGN. A data terminal (e.g., a personal computer) 300 sends via a UNI (User Network Interface) 302 a connection request to a server 306 in a service stratum 304. The server 306, which has session control functions, sends a resource request to a transport stratum 308 having transport control functions. The resource request is received by the device-control unit 1 which acts as an RACF server. The device-control unit 1 controls resources in the transport control functions, to maintain a desired QoS (Quality of Service) on a per-quality-class basis. This improves the utilization of the resources in the whole system of the transport control functions.

The data terminal 300 is connected via a switch 320 with the network 200 with which other networks are connected via a switch 322.

As will be evident from the foregoing, the device-control units 1 and the device-control methods according to the illustrative embodiments of the invention, would allow a requested resource to be controlled to satisfy a resource request, without any needs for calling different interfaces varying between the devices 5, resulting in a reduction in the computational burden of the device-control unit 1 for the devices 5 for resource control.

Reference throughout the specification to "one embodiment" or "an embodiment" means that a particular feature, structure, or characteristic described in connection with the embodiment is included in at least one embodiment of the present invention.

Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An apparatus connected via a communication network, with a plurality of controllable devices that control a plurality of corresponding resources,
   wherein the plurality of resources includes at least one of a network resource, a computational resource and a storage resource, and each device of the plurality of controllable devices is controlled by a corresponding device controller,
   the apparatus operating for controlling the devices, in combination with:
   a registry storage for storing information of device configurations and storing device identifiers for identifying the respective devices, in association with each resource; and
   a repository storage for storing a correspondence between the device identifiers and device controllers which match the respective devices, and which are executed to control the respective devices, by calling a common interface which is shared between the device controllers,
   the apparatus comprising:
   a resource-request receiver configured to receive a resource request including information for identifying a requested one of the plurality of resources, which is requested to be controlled, and information for identifying a requested size of the requested resource which is requested to be reached;
   a service manager configured to retrieve from the registry storage, at least one of the device identifiers which corresponds to at least one of the plurality of devices which is associated with the requested resource of the received resource-request;
   a repository retriever configured to retrieve from the repository storage, one of the device controllers which corresponds to the retrieved at least one device-identifier, and to install the retrieved device controller into a library; and
   a control manager configured to call the common interface of the installed device controller, to thereby execute the installed device controller, in order to control the requested resource on the retrieved device to reach the requested size, and, after completion of the control of the retrieved device, to uninstall the previously-installed device controller from the library.

2. The apparatus according to claim 1, wherein the registry storage includes a registry storage server located outside of the apparatus,
   the repository storage includes a repository storage server located outside of the apparatus,
   the apparatus is connected with the registry storage server and the repository storage server, via the network,
   the service manager is configured to retrieve the at least one designated device-identifier from the registry storage server, for the requested resource, and
   the repository retriever is configured to retrieve the designated device controller from the repository storage server, for each device-identifier.

3. The apparatus according to claim 1, wherein the library is an OSGi (Open Services Gateway initiative) framework, and
   each of the device controllers is a bundle of Java modules.

4. The apparatus according to claim 1, wherein the resource request includes, in addition to information for the requested resource and the requested size, a projected instant-time,
   the apparatus further comprising a schedule manager configured to hold the resource request, determine, using a timer, whether the projected instant-time has been reached, and, if so, deliver the resource request to the resource-request receiver.

5. The apparatus according to claim 1, wherein the control manager is further configured to uninstall the designated device controller from the library, if a predetermined length of time has elapsed since completion of control of the designated device controller by the control manager.

6. The apparatus according to claim 1, wherein
   the apparatus controls the network resource when selected as the requested resource, such that at least one of a communication bandwidth and forwarding priority is controlled, controls the computational resource when selected as the requested resource, such that at least one of a CPU clock frequency, a CPU core number, a memory size, a disc storage capacity and a communication bandwidth is controlled, and controls the storage resource when selected as the requested resource, such that at least one of a disc storage capacity, a storage redundancy level and a communication bandwidth is controlled.

7. A method implemented in an apparatus connected via a communication network, with a plurality of controllable devices that control a plurality of corresponding resources,
   wherein the plurality of resources includes at least one of a network resource, a computational resource and a storage resource, and each device of the plurality of controllable devices is controlled by a corresponding device controller,
   the method implemented for controlling the devices, using:
   a registry storage for storing information of device configurations and storing device identifiers for identifying the respective devices, in association with each resource; and
   a repository storage for storing a correspondence between the device identifiers and device controllers which match the respective devices, and which are executed to control the respective devices, by calling a common interface which is shared between the device controllers,
   the method comprising:
   receiving a resource request including information for identifying a requested one of the plurality of resources, which is requested to be controlled, and information for identifying a requested size of the requested resource which is requested to be reached;

retrieving from the registry storage, at least one of the device identifiers which corresponds to at least one of the plurality of devices which is associated with the requested resource of the received resource-request;

retrieving from the repository storage, one of the device controllers which corresponds to the retrieved at least one device-identifier;

installing the retrieved device controller into a library;

calling the common interface of the installed device controller, to thereby execute the installed device controller, in order to control the requested resource on the retrieved device to reach the requested size; and after completion of the control of the retrieved device, uninstalling the previously-installed device controller from the library.

8. A computer-readable non-transitory storage medium having stored therein a program, when executed by a computer, to implement the method according to claim 7.

* * * * *